3,116,340
PROCESS FOR CONVERTING ALKYLATED
AROMATIC HYDROCARBONS
Emmett H. Burk, Jr., Hazel Crest, Ill., Theodore H. Korelitz, Newton, Mass., and Robert H. Jordan, Harvey, Ill., assignors, by mesne assignments, to Sinclair Research, Inc., New York, N.Y., a corporation of Delaware
Filed Mar. 28, 1961, Ser. No. 98,976
5 Claims. (Cl. 260—671)

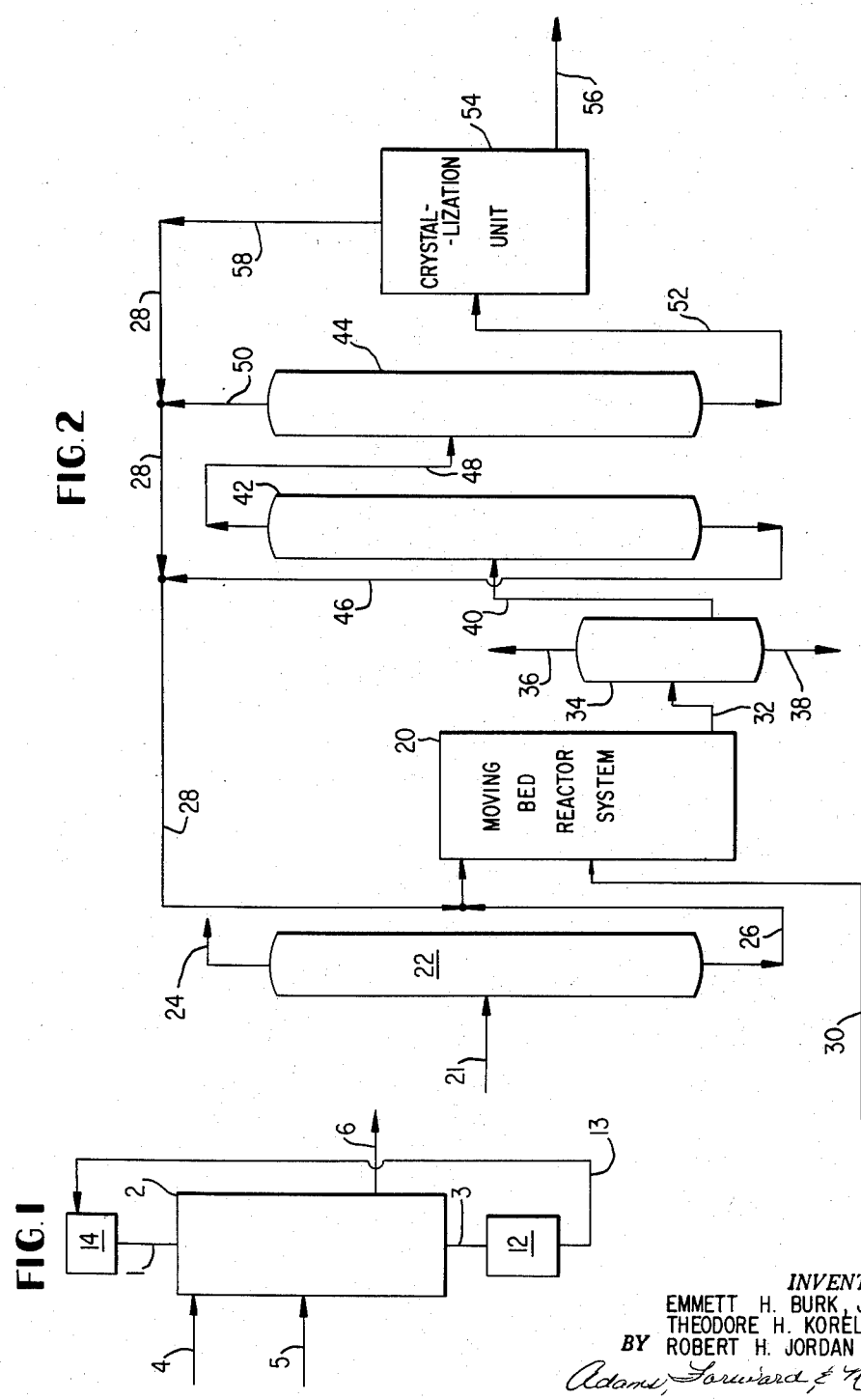

This invention relates to the isomerization-disproportionation-transalkylation (isom-dis-trans) and alkylation of aromatics using a catalytic system. Alkylated aromatics are of value in many fields and some are particularly desirable as constituents of high octane aviation fuels and as sources of plastics and synthetic detergents.

In the prior art, usually two reactors are used with the alkylation reaction being completed in one reactor before the isom-dis-trans reactions are effected in another reactor. The process of the present invention involves, in one facet, reversing the order of the two sets of reactions outlined in the prior art in one reaction vessel, and, in another facet, employing a moving catalyst bed reactor with continuous catalyst regeneration. In the moving bed procedure, catalyst in the form of macrosize particles, regular or irregular in shape and generally from about $1/16$ to $1/2$, preferably about $1/8$ to $1/4$, inch diameter and, if not spherical in form, from about $1/16$ to 1, preferably from about $1/8$ to $1/4$, inch in length, is moved as a compact mass in a single general direction, such as from a catalyst inlet to an outlet, through a hydrocarbon conversion zone, and is usually circulated as a compact moving mass through successive stages of hydrocarbon conversion and catalyst regeneration. Between the conversion and regeneration zones the catalyst may or may not be transported as a compact mass. The moving bed can be moved in any direction, for instance, upwardly or it can gravitate downwardly through a hydrocarbon conversion zone, either countercurrently or concurrently with the hydrocarbon material and with a minimum of backmixing between the hydrocarbon material and the catalyst. The hydrocarbon material essentially moves in one direction from feed inlet to product outlet. The moving bed procedure can be distinguished from a fluidized bed employing powdery catalytic material which does not move through a conversion zone as a compact mass and involves a considerable degree of backmixing between the catalyst and hydrocarbon material in the conversion zone.

U.S. Patent No. 2,756,261 is representative of the prior art and outlines a process for the production of durene (1,2,4,5-tetramethylbenzene) from other methylbenzenes by alkylation with methanol. This process entails the use of two distinct reactors, one being primarily for the methylation of the polymethylbenzene feed, and another for the isomerization-disproportionation-transalkylation (isom-dis-trans) of the polymethylbenzenes produced in the alkylation step.

When using an alcohol as the alkylating agent in the alkylation reaction, a mole of water is produced for each alkyl group added to a mole of aromatic. Ether also yields water and can be present during the alkylation reaction either as the charged alkylating agent or it can result from a side reaction when an alkanol is used as the agent wherein the alkanol condenses to form dialkyl, e.g. dimethyl, ether. The water formed in these reactions acts as a temporary poison to the catalyst for the slower isom-dis-trans reactions.

In the process of the present invention involving alkylation which results in the production of water a single moving catalyst bed reactor is satisfactory for both steps of the process. The aromatic hydrocarbon enters the initial or aromatic-entering portion of the reaction zone in the moving bed reactor in the absence of alkylating agent. The alkylating agent is injected into the reactor at a point approximately between the center of the reaction zone and the hydrocarbon outlet of the bed. In this way, the reaction zone between the aromatic inlet and the alkylating agent inlet will be essentially free of water and the isom-dis-trans reactions can be carried out essentially in the absence of catalyst-deactivating water. In the remaining portion of the bed, the alkylation reaction predominates with minimum catalyst deactivation taking place due to the formation of water.

The alkylating agent is contacted with the aromatic feed in the moving catalyst bed after the aromatic feed has been in contact with the catalyst under isom-dis-trans conditions. The point of entrance of the alkylating agent to the moving catalyst bed is selected to give an alkylation to isom-dis-trans space velocity ratio of about 0.1 to 2:1, preferably about 0.5 to 2:1.

Another undesirable side reaction which occurs during alkylation is the formation of coke during decomposition of the alkylating agent, e.g. methanol, and aromatics. The coke formed in this manner rapidly deactivates the catalyst thereby limiting the length of the processing cycle in a fixed bed reactor. The prior art deals for the most part with fixed bed reactors. Because of the rapid coke formation various methods are employed to reduce the rate of alkylating agent decomposition. Among these methods are the use of (1) elevated pressures, (2) hydrogen, and (3) highly selective catalysts. These methods all require large capital expenditures and result in high operating costs, yet it is still often necessary to provide swing reactors for the alkylation reaction because of the coke buildup. A "swing" reactor is one adapted to temporarily replace a reactor on stream to provide for continuous processing while catalyst in the latter is regenerated. In comparison, the moving bed process of the present invention can be operated at atmospheric pressure without addition of free hydrogen and with very inexpensive catalyst (e.g. silica-alumina). In addition, it is economical since a single reactor is sufficient because of the continuous catalyst regeneration facilities which are provided while continuing processing of the feed.

The advantages of this moving bed process over the processes described in the prior art can be summarized as follows: All the reactions can be carried out in a single moving catalyst bed reactor system vs. two separate fixed catalyst beds; the moving bed reactor system can be run at atmospheric pressure, without hydrogen or other diluting agents, and with readily available, inexpensive, catalysts; continuous regeneration facilities of the moving bed system eliminate the need for swing reactors; when methylating, ethyl group build-up on the aromatic nucleus is avoided; and greater processing flexibility is provided.

The aromatics, e.g. alkyl aromatic hydrocarbons, suitable for conversion in the present process include mono- and polycyclic aromatic hydrocarbon compounds such as benzene, alkyl benzene and its lower alkyl homologues, e.g. toluene, and the xylenes, naphthalene, and indane, which may be other than alkyl substituted or unsubstituted. The alkyl aromatic compounds must, however, contain at least one hydrogen attached to the aromatic nucleus and are preferably methyl-substituted. When benzene is employed in the isom-dis-trans phase of the present process, alkyl radicals can be present and can be provided, for instance by the presence of alkylated aromatics, such as those described above, in the benzene feed or in the reaction zone. These compounds may correspond to the general formula

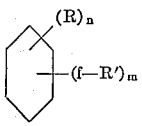

where R is an alkyl radical containing generally from about 1 to 2 carbon atoms, preferably methyl; n is 0 or 1 to 3 or even 5; R' is an aromatic hydrocarbon ring, preferably $C_4H_4$; f indicates a fused ring relationship (two carbons atoms common to two aromatic nuclei, e.g. as in naphthalene); and m generally 0 to 1 or more. R may also be a divalent hydrocarbon group attached to the aromatic ring at two carbon atoms of the ring, e.g. alkylene, as in decalin and tetralin. The preferred aromatics, however, include alkyl benzenes corresponding to the above formula when m is 0 and n is of the same designation given above. The aromatic rings and R groups may be substituted with other radicals which do not prevent the desired reaction. Suitable aromatic hydrocarbons include toluene, ortho-xylene, meta-xylene, para-xylene, ethyl-benzene, ortho-ethyltoluene, meta-ethyltoluene, para-ethyltoluene, 1,2,3-trimethylbenzene, 1,2,4-trimethylbenzene, and 1,3,5-trimethylbenzene. Examples of other alkylatable alkyl aromatic hydrocarbons containing condensed benzene rings include alkyl naphthalene, alpha-methylnaphthalene, and beta-methylnaphthalene.

In the present process, the fresh aromatic feed can be combined with aromatic-containing recycle having an average number of carbon atoms greater than the aromatic feed and preferably having about the same average number of carbon atoms as the total aromatic hydrocarbons in the alkylation effluent and as the product withdrawn. Thus we prefer the total aromatic hydrocarbons in the alkylation effluent to have on the average approximately the same number of carbon atoms as the product separated from the system. For instance, in the case of producing durene from xylene with recycle of more than about 50% of the total aromatic product, the overall aromatic feed to the reaction, i.e. fresh xylene plus recycle, will have an average number of carbon atoms of more than 9 but less than 10.

The alkylating agents suitable for use in the present process are "condensation alkylating agents" and include organic compounds containing an alkyl radical which is transferable to the aromatic nucleus. These compounds are aliphatic and include alkyl ethers generally containing from about 2 to 4 carbon atoms, preferably from about 2 to 3 carbon atoms, and also contain a radical, e.g. an alkyl radical, which displaces a nuclear hydrogen of the aromatic through condensation. The alkylation agent is preferably saturated and frequently contains oxygen which produces water during the alkylation reaction.

A number of suitable alkylating, e.g. methylating, agents, correspond to the general formula R—O—R' where R is a monovalent hydrocarbon radical, usually lower alkyl and preferably containing 1 to 2 carbon atoms and R' is hydrogen or R, such as a lower alkyl radical preferably containing 1 to 2 carbon atoms. The alkylating agents usually do not have more than about 4 carbon atoms. Specific alkylating agents include alkanols such as ethanol and preferably methanol; and alkyl ethers such as dimethyl ether, diethyl ether, methyl, ethyl ether and like members whether substituted with non-interfering groups or not. When the alkanols are employed, they may go through an intermediate ether stage.

The operation of the moving bed method in connection with the present invention will be more clearly illustrated by reference to FIGURES 1 and 2 of the drawing which are not intended as a limitation on the scope of this invention.

The isom-dis-trans and alkylation reactions are advantageously accomplished by employing a moving catalytic bed procedure with successive reaction zones. In the moving bed procedure as described in FIGURE 1, hot catalyst is continuously circulated as a compact mass through a treating system having alternate stages of hydrocarbon conversion and catalyst regeneration. The catalyst is introduced by way of line 1 into the top of a conversion zone (reactor) 2, gravitates downwardly through the conversion or reaction zone and is removed from the bottom of the zone by way of line 3 at a rate sufficient to give the desired amount of carbon deposit on the catalyst. In the process of the present invention, the aromatic feed can be introduced into the upper portion of the conversion zone through line 4 in the absence of the alkylating agent and is conducted concurrent with the flow of the catalyst under isom-dis-trans conditions. After undergoing isom-dis-trans it is contacted with alkylating agent, introduced through line 5, so it flows downward, under alkylating conditions, and after being alkylated, the product is recovered through line 6. The catalyst removed through line 3 can be conducted to, and regenerated in, regenerator 12, lifted by air lift 13 to separator surge 14 and introduced into line 1 for reuse in the system. A $N_2$ seal can be used in line 1 and line 3. The catalyst employed in the process can be easily regenerated employing conventional procedures to remove carbon deposited on the catalyst, for instance by subjecting it to an oxygen-containing gas at temperature sufficient to burn carbon off of the catalyst. This oxygen-containing gas, e.g. an oxygen-nitrogen mixture, often contains about 0.01 to 5 weight percent oxygen, preferably about 0.5 to 1.5, and is introduced at a flow rate such that the maximum temperature at the site of combustion is usually below about 1000° F.

FIGURE 2 of the drawing illustrates the moving bed procedure of FIGURE 1 in connection with an advantageous system for practicing the present invention. The moving bed procedure of FIGURE 1 is designated as 20. Aromatic feed, e.g. xylene, is conducted through line 21 into fractionator 22 where it is purified, e.g. separated from ethylbenzene, which is removed through overhead line 24. Ethylbenzene-free xylenes in line 26 are combined with aromatic recycle from line 28 and are conducted into moving bed reactor system 20. Alkylating agent, e.g. methanol, is conducted by line 30 into system 20. Product from system 20 is passed to flash drum 34 by way of line 32, gas is released through line 36, a water phase is removed through line 38, and an aromatic liquid phase from the flash drum is conducted through line 40 to first tower 42 of a two-tower heartcut fractionation system also including second tower 44. The bottom stream from the first tower containing aromatic compounds boiling higher than the desired product, e.g. tetramethyl benzenes, is conducted through line 46 to recycle line 28. The overhead from tower 42 is conducted through line 48 to tower 44 where aromatic compounds boiling lighter than the tetramethyl benzenes are conducted through line 50 to recycle line 28. The bottoms stream from tower 44 which contains a high concentration of the desired product, for instance durene in this instance, is conducted through line 52 to crystallization unit 54 where high purity durene is recovered through line 56 and durene mother liquor is conducted through line 58 to recycle line 28. Although the reactants are illustrated in a concurrent flowing relationship with the catalyst as noted above, a countercurrent relationship can also be employed and the catalyst can move upward through the reactor if desired.

The countercurrent flowing relationship is particularly desirable when employing an ether such as dimethyl ether as the alkylating agent. In the concurrent flowing relationship, the catalyst passes through the isom-dis-trans zone before it enters the alkylation zone and the catalyst contains a considerable amount of absorbed hydrocarbons upon arrival at the latter zone. When using dimethyl ether as the alkylating agent, it was found that the absorbed aromatic hydrocarbon delayed alkylation and resulted in lower utilization of the dimethyl ether alkylating agent for alkylation. This delay in alkylation can be avoided to a considerable extent with the use of a countercurrent flowing relationship between the catalyst and the reactants, since the aromatic hydrocarbon from the isom-dis-trans zone is contacted with "fresh" or newly regenerated catalyst as the aromatic hydrocarbon moves through the alkylation zone. Apparently under these circumstances the ether does not have to displace the aromatic from the catalyst in order for alkylation to take place or at least the amount of aromatic to be replaced is considerably reduced.

Catalysts which can be employed in accordance with the present invention include solid acidic materials. Although the surface area of the catalyst may be varied within wide limits, it has been discovered in accordance with the present invention that unexpectedly superior yields of durene are obtainable when the surface area of the catalyst is within the range of about 100 to 200 m.$^2$/gm. The catalysts include synthetic gel-type catalysts, for instance those disclosed in U.S. Patents Nos. 2,384,505 and 2,542,190, hereby incorporated by reference, and clay catalysts. These catalysts are acidic, solid, mixed oxide hydrocarbon cracking catalysts. Advantageously we employ calcined silica-based or silica-containing catalysts, for instance containing a major proportion, at least about 50 percent, of silica and minor amounts of solid acidic oxides. A silica-based catalyst can be an aromatic alkylation catalyst and include solid metal oxide or mixed solid oxides of metals or non-metals.

Silica-alumina catalysts represent the preferred class of catalysts because of their low cost, regenerability, high rate of conversion obtained, and their stability at the operating conditions employed. The synthetic gel-type of silica-alumina catalyst, such as the coprecipitated silica-alumina and alumina precipitated on silica type, is preferred. Popular synthetic gel cracking catalysts generally contain about 10 to 30% alumina for instance, 12% alumina. Two such catalysts are "Aerocat" which contains about 13% $Al_2O_3$, and "High Alumina Nalcat" which contains about 25% $Al_2O_3$, with substantially the balance being silica. The catalyst may be only partially of synthetic material, e.g. as may be made by precipitation of silica-alumina on an activated clay. One example of such catalysts contains about equal amounts of silica-alumina gel and clay.

The production of synthetic catalysts can be performed, for instance, (1) by impregnating silica with aluminum salts; (2) by direct combination of precipitated (or gelated) hydrated alumina and silica in appropriate proportions; or (3) by joint precipitation of alumina and silica from an aqueous solution of aluminum and silicon salts. Synthetic catalysts may be produced by the combination of hydrated silica with other hydrate bases as, for instance, magnesia, zirconia, etc. These synthetic gel-type catalysts are activated or calcined before use.

When following the above catalyst preparation procedures, for instance (1), after impregnation, the resulting impregnated product is dried generally at a temperature within the range of about 170° F. to 400° F. for at least about 6 hours and up to 24 hours or more with a slow stream of air circulated to carry off the water vapor. The dried alumina catalyst mixture then may be formed by a tabletting or extruding operation. If the catalyst is to be in finely divided form, a grinding operation may follow drying. In the case of tabletting it is customary to incorporate a die lubricant which advantageously is organic and can be burned out by oxidation in the calcination step. In the moving bed procedure, the catalyst is advantageously comprised of macrosize particles of size and configuration described above.

The pellets or particles so obtained are suitable for subjection to high temperature treatment or calcination at a temperature between about 500° F. and about 1400° F., usually about 700° F. and 1000° F., for a period of between about 2 and about 36 hours. It is generally preferred that the calcining operation when containing $Al_2O_3$, be conducted to minimize contact time of the alumina-containing product with water vapor at the high temperatures encountered. While the calcination or heat treatment will generally be conducted in air, it is also feasible, although generally less desirable, to carry out the same in other oxidizing atmospheres, a reducing atmosphere such as for example, hydrogen or methane, or an inert atmosphere, such as nitrogen. In some instances, it may be desirable to carry out the calcination initially in a blend of air and nitrogen followed by heat treatment in an atmosphere of hydrogen.

The isom-dis-trans and alkylation reaction conditions used in the method of the present invention generally include a temperature sufficient to maintain the aromatic and alkylating agent feeds in the vapor phase under the pressure employed. This temperature may be from about 400 to 1000° F., preferably from about 700 to 900° F. while the pressure may range from about ambient pressure or less up to about 2000 p.s.i.g., and are preferably ambient pressures up to about 100 p.s.i.g. The catalyst is used as a moving bed system. The aromatic space velocity will in most cases be from about 0.1 to 10, preferably from about 2 to 5 weights of aromatic per weight of catalyst per hour (WHSV). The alkylating agent is generally employed in a molar ratio to the aromatic of about 0.1:1 to 2:1 and preferably of about 0.1:1 to 1:1.

The catalyst employed in the process of the present invention can be easily regenerated employing conventional procedures, for instance by subjecting it to an oxygen-containing gas, e.g. air, at temperatures sufficient to burn off carbon deposited on the catalyst during the alkylation and isom-dis-trans reactions. The oxygen-containing gas is preferably introduced at a flow rate such that the maximum temperature at the side of combustion is below about 1100° F.

The following examples will serve to illustrate the present invention but they are not to be considered limiting.

EXAMPLES I AND II

Ethyl benzene-free xylenes are combined with aromatic recycle; the combined stream is heat exchanged with reactor effluent with the feed being heated to 700° F. and then fed to the moving bed reactor. Methanol is also heat exchanged with reactor effluent, and injected into the alkylation section of the reactor. The catalyst, Socony "Durabead," a silica-alumina catalyst (12% $Al_2O_3$) (spheres of about 0.16" diameter), drops from the separator-surge into the reactor, from the reactor into the regenerator where the coke is burned off in the presence of air, then into the lift pot where high velocity air blows it back up to the separator-surge. Reactor conditions are as follows:

| | |
|---|---|
| Temperature ° F | 700 |
| Pressure p.s.i.g. | 10–20 |
| Overall arom, WHSV | 5.0 |
| Methanol/arom mol ratio | 0.6/1 |

The coke on catalyst is estimated to be about 1 weight percent. The regenerator is controlled for a maximum temperature of 1100° F. The catalyst and flue gases are cooled to about 750° F. by the generation of 125 lbs. steam in coils along the walls of the regenerator. The catalyst is further cooled by the lift air and nitrogen seal to process temperature. Flue gas is exchanged with lift air before it goes to the stack.

Reactor effluent is cooled to 100° F. and sent to an atmospheric flash drum. The gas release contains large amounts of methanol and dimethyl ether. A liquid water phase is drawn from the bottom of the flash drum. The $C_{10}$ average aromatic liquid phase from the flash drum is fed to the first tower of two tower heartcut fractionation system. The bottoms stream from the first tower containing aromatic compounds boiling higher than the tetramethyl benzenes is recycled to the reactor. The overhead from this tower is fed to the second tower where aromatic compounds boiling lighter than the tetramethyl benzenes are taken overhead and recycled to the reactor. The second tower bottoms stream which contains a high concentration of durene is fed to a crystallization unit where high purity durene is recovered. The durene mother liquor from the crystallization unit is also recycled to the reactor.

Reactions have been conducted under conditions and in a manner designed to represent moving bed reactor conditions, that is a fixed bed of equilibrium, regenerated "Durabead" catalyst was employed for about fifteen minutes in each run. The conditions and results for these runs are presented in Table I.

and the catalyst that enters the alkylation zone has only the small amount of coke formed in the isom-dis-trans zone laid down on it. Dimethyl ether was employed as the alkylating agent since approximately 70 weight percent of the effluent gas can be recovered and recycled to the alkylation zone in a commercial unit.

Table II provides the conditions and results for an example of a run made in the moving bed reactor. Orthoxylene (0.7 mole) and a mixed polymethylbenzene stream (5.9 moles) that had been recycled six times previously were fed to the reactor. The conditions and results for this run are presented in Table II.

EXAMPLE IV

The following example was conducted essentially according to the procedure set forth in Example III. The

*Table I*

|  | Feed | Example 1 | | Example 2 | |
|---|---|---|---|---|---|
|  |  | Product | Isom-Dis-Trans Equilibrium | Product | Isom-Dis-Trans Equilibrium |
| Run No. |  | 1151-3 |  | 1151-4 |  |
| Temperature, °F. |  | 700 | 700 | 800 | 800 |
| Pressure |  | Atm. |  | Atm. |  |
| WHSV Alkylation |  | 10 |  | 10 |  |
| Isom-Dis-Trans |  | 10 |  | 10 |  |
| MeOH/Arom Mol Ratio |  | 0.56 |  | 0.58 |  |
| Mol percent: |  |  |  |  |  |
| $C_7$ Arom |  |  | 0.2 | 0.1 | 0.3 |
| $C_8$ Arom | 18.8 | 16.9 | 3.7 | 16.6 | 4.1 |
| $C_9$ Arom | 6.0 | 10.6 | 19.0 | 11.7 | 19 |
| $C_{10}$ Arom | 58.3 | 47.8 | 52.4 | 49.2 | 51.6 |
| $C_{11}$ Arom | 16.6 | 17.6 | 24.0 | 16.8 | 24.1 |
| $C_{12}$ Arom | 0.3 | 7.1 | 0.7 | 5.6 | 0.9 |
| Avg. Carbon Number | 9.736 | 9.876 | 10.00 | 9.829 | 10.00 |

These examples show the results of runs in which a mixed polymethylbenzene stream was methylated in a pseudo-moving bed reactor. The desired product was durene.

EXAMPLE III

In the following example, a moving bed reactor in a concurrent flowing relationship was employed. In the moving bed reactor the aromatic hydrocarbon feed passes through an isom-dis-trans zone before the alkylating agent enters the reactor system. Thus the isom-dis-trans zone is free of the water that is formed in the alkylation zone conditions and results for this example, run No. 1151-58, are presented in Table II.

*Table II*

|  | Feed | Example III | | Example IV |
|---|---|---|---|---|
|  |  | Product | Isom-Dis-Trans Equilibrium | Product |
| Run No. |  | 1151-57 |  | 1151-58. |
| Temperature, °F. |  | 850 | 850 | {850 (isom-dis-trans). 855 (alkylation). |
| Pressure |  | Atm. |  |  |
| WHSV Alkylation |  | 3.56 |  | 5.2. |
| Isom-Dis-Trans |  | 5.35 |  | 2.6. |
| DME (dimethyl ether)/Arom Mol Ratio |  | 0.42 |  | 0.49/1. |
| Mol Percent: |  |  |  |  |
| $C_7$ Arom | .98 | 1.05 | 2.7 | 3.2 |
| $C_8$ Arom | 26.09 | 18.66 | 13.1 | 75.9. |
| $C_9$ Arom | 27.46 | 29.92 | 26.2 | 14.3. |
| $C_{10}$ Arom | 28.74 | 31.76 | 40 | 4.2. |
| $C_{11}$ Arom | 11.36 | 12.59 | 17.5 | 1.5. |
| $C_{12}$ Arom | 5.10 | 5.68 | .5 | .7. |
| $C_{13}$ Arom | .29 | .31 |  |  |
| Avg. Carbon Number | 9.40 | 9.57 | 9.57 | 8.27. |

It is claimed:
1. A process for converting alkylated aromatic hydrocarbon under conditions including temperatures from about 400 to 1000° F. to effect isom-dis-trans and alkylation of the aromatic hydrocarbon and comprising contacting the aromatic hydrocarbon with a unidirectionally moving bed of acidic, silica-based catalyst under isomerization, disproportionation and transalkylation conditions and contacting resulting aromatic hydrocarbon with said moving bed of acidic, silica-based catalyst and a condensation alkylating agent under alkylation conditions including introducing the alkylating agent at an alkylation to isom-dis-trans aromatic space velocity ratio of about 0.1 to 2:1 to alkylate aromatic hydrocarbon.

2. The process of claim 1 wherein the catalyst is silica-alumina.

3. The process of claim 2 wherein alkylated aromatic hydrocarbon is separated from the alkylation effluent and a portion of the total alkylated aromatic hydrocarbon alkylation effluent is recycled to the isom-dis-trans reaction.

4. The process of claim 3 wherein the recycle stream has on the average approximately the same number of carbon atoms as the separated alkylated aromatic hydrocarbon and wherein an aromatic hydrocarbon of a lesser number of carbon atoms is also fed to the isom-dis-trans reaction.

5. The process of claim 4 wherein the separated hydrocarbon is durene and the aromatic hydrocarbon of a lesser number of carbon atoms is xylene.

References Cited in the file of this patent

UNITED STATES PATENTS 2,756,261      Fetterly  ---------------  July 24, 1956